United States Patent [19]

Powers

[11] Patent Number: 4,726,827

[45] Date of Patent: Feb. 23, 1988

[54] METHOD AND APPARATUS FOR PRODUCING AN OPTICAL FIBER PREFORM

[75] Inventor: Dale R. Powers, Painted Post, N.Y.

[73] Assignee: Corning Glass Works, Corning, N.Y.

[21] Appl. No.: 776,505

[22] Filed: Nov. 7, 1985

Related U.S. Application Data

[62] Division of Ser. No. 427,523, Sep. 29, 1982, Pat. No. 4,568,370.

[51] Int. Cl.[4] .................... C03C 25/02; C03B 19/06
[52] U.S. Cl. .......................................... 65/3.12; 65/144
[58] Field of Search ................ 65/3.12, 3.2, 18.2, 65/18.4, 144

[56] References Cited

U.S. PATENT DOCUMENTS

| | | | |
|---|---|---|---|
| 3,957,474 | 5/1976 | Kobayashi et al. | 65/3.12 |
| 4,242,118 | 12/1980 | Irven | 65/3.12 |
| 4,378,985 | 4/1983 | Powers | 65/3.12 |
| 4,428,762 | 1/1984 | Andrejco et al. | 65/18.2 |

Primary Examiner—S. Leon Bashore
Assistant Examiner—Michael K. Boyer
Attorney, Agent, or Firm—William J. Simmons, Jr.

[57] ABSTRACT

A porous glass optical waveguide preform is formed by depositing a coating of glass particulate material on the lateral surface of a core which may be a porous glass body continuously produced by the axial deposition of glass particles. The core rotates and moves longitudinally in one direction with respect to two flame hydrolysis burners which emit streams of glass particles having different compositions. In addition, the two burners reciprocatingly move with respect to a portion of the length of the core. The speed of each burner varies as it traverses along its path of reciprocating motion. The thickness of the layer produced by a burner at a given point is inversely related to the speed of the burner as it passes that point. The layers formed by the completion of a single traverse by both burners combine to form a conically-shaped layer, the composition of which varies from the base toward the apex thereof. The conically-shaped layer, which are adjacently located longitudinally along the preform, combine to form a cylindrically-shaped portion of the preform.

8 Claims, 22 Drawing Figures

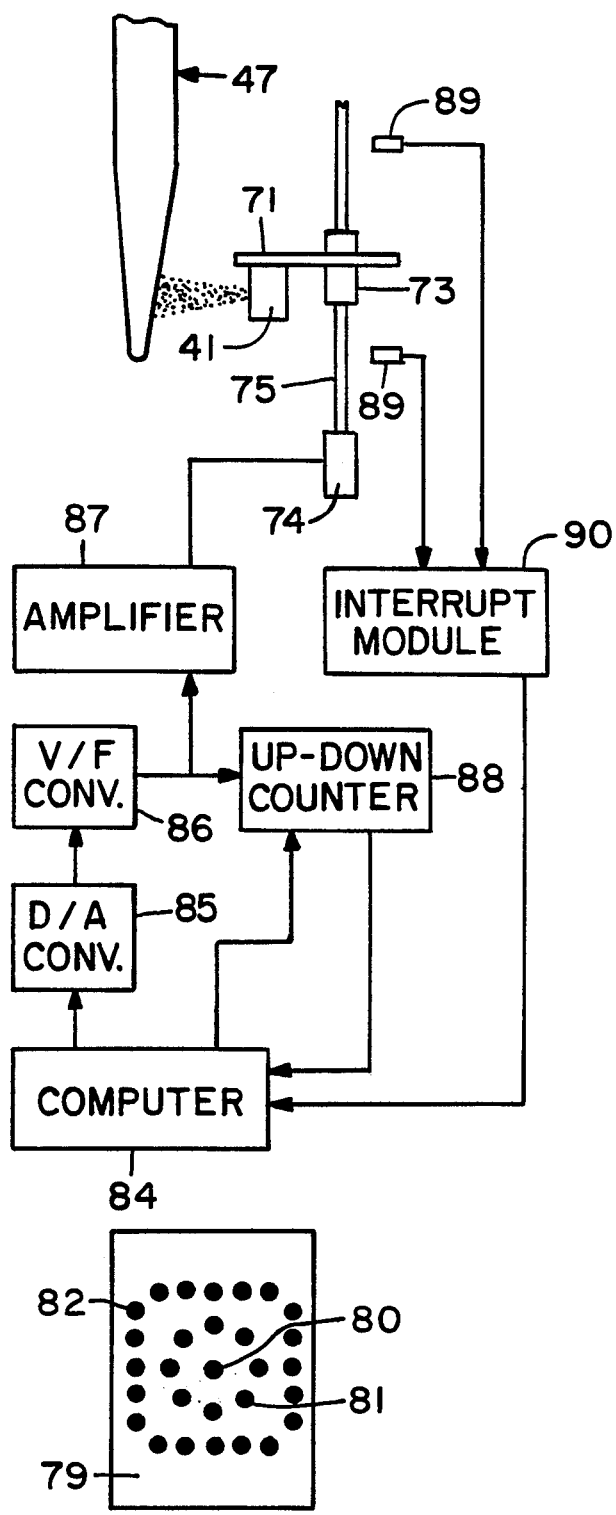
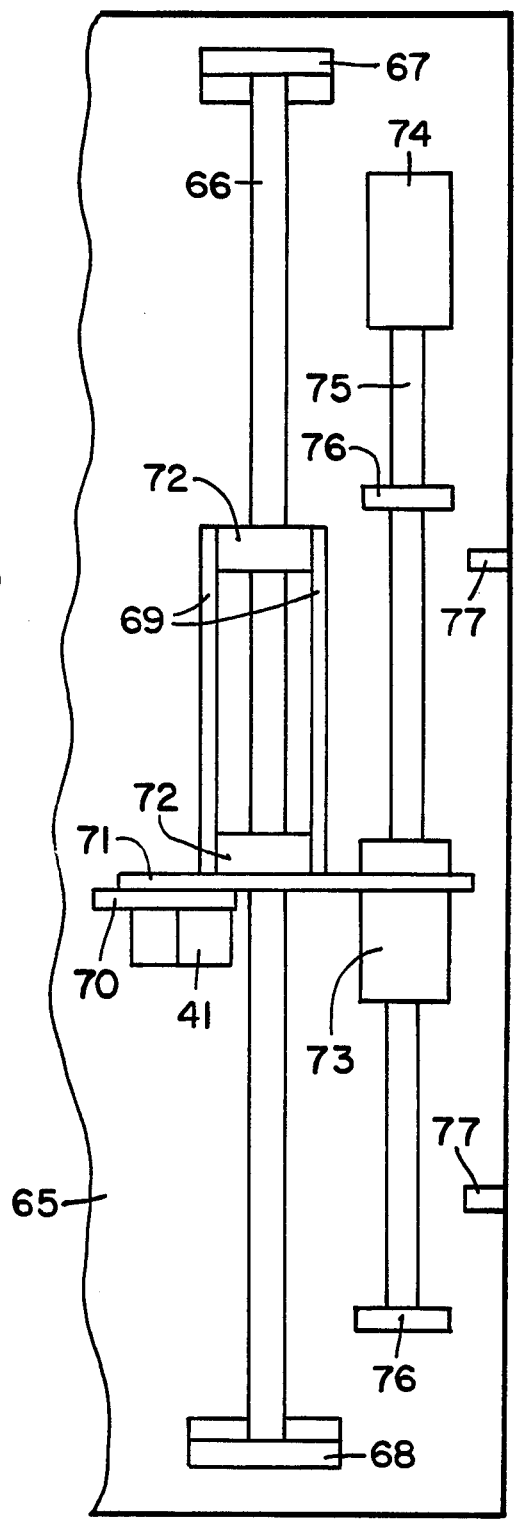
Fig. 7
Fig. 6
Fig. 5

METHOD AND APPARATUS FOR PRODUCING AN OPTICAL FIBER PREFORM

This is a division of application Ser. No. 427,523 filed Sept. 29, 1982, now U.S. Pat. No. 4,568,370.

BACKGROUND OF THE INVENTION

Optical waveguide fibers have been greatly improved during the last decade. Fibers exhibiting very low losses are generally formed by chemical vapor deposition (CVD) techniques which result in the formation of extremely pure materials. In accordance with these techniques, optical waveguide preforms can be formed by depositing and thereafter consolidating glass particles called "soot" on the surface of a mandrel by outside vapor deposition (OVD), or on the inside surface of a tube which later forms at least a portion of the cladding material, or by some combination of these techniques.

Although CVD techniques of forming optical waveguide preforms result in the formation of optical waveguide fibers have extremely low attenuation, such techniques are relatively expensive. Fiber manufacturing cost can be lowered by increasing preform size or by continuously drawing fiber from a preform while the preform is being formed. Both of these cost reducing techniques decrease the number of preform handling and processing steps per unit of fiber length.

The OVD technique readily lends itself to cost reduction modifications. Initially, preforms were made larger by increasing the diameter. This was accomplished by traversing the burner longitudinally along the soot preform and adding thereto additional layers of increasing radius. Thereafter, axial techniques were developed whereby one or more burners or other soot depositing nozzles were directed axially toward a starting member. As the thickness of the deposited soot layer increases, the starting member moves away from the burners. Axial vapor phase oxidation techniques are taught in U.S. Pat. Nos. 3,966,446, 4,017,288, 4,135,901, 4,224,046 and 4,231,774.

A hybrid technique whereby a core is formed by axial vapor phase oxidation, and a cladding layer is simultaneously deposited on the core by radially inwardly directed glass soot streams is taught in U.S. Pat. Nos. 3,957,474, 4,062,665, and 4,310,339. As the core is formed, it is withdrawn from the burners or nozzles which formed it. The cladding is deposited by stationary burners or nozzles.

Substantially continuous methods of forming optical waveguide fibers by vapor phase oxidation techniques are taught in U.S. Pat. No. 4,230,472 issued to P. C. Schultz and U.K. Patent Application GB No. 2,023,127A.

Deposition rate in the aforementioned CVD processes is determined by the temperature gradient within the gas stream in which the soot particles are entrained. See the publication, P. G. Simkins et al., "Thermophoresis: The Mass Transfer Mechanism in Modified Chemical Vapor Deposition", Journal of Applied Physics, Vol. 50, No. 9, September, 1979, pp. 5676–5681. Thermophoresis drives the soot particles from the hotter parts of the gas stream toward the cooler parts. Because the substrate or preform surface is usually cooler than the surrounding gas stream, the action of thermophoresis tends to drive the soot particles toward the preform surface. When a surface is nearly as hot as the surrounding gas stream, the temperature gradient is low. Thus, the thermophoresis effect is minimal, and the deposition rate is low. However, when the surface temperature of the preform surface is low, the thermophoresis effect due to the large thermal gradient results in a relatively high deposition rate.

In the aforementioned hybrid technique, a burner is continuously directed at one position on the preform. Thus, the preform surface becomes hot, and the rate of deposition is limited by the small temperature gradient between the preform surface and the soot-containing gas stream.

The method described in my U.S. Pat. No. 4,378,985 achieves an enhancement in deposition rate and efficiency by advantageously utilizing the thermophoresis effect. In accordance with that method a porous glass optical waveguide preform is formed by depositing a coating of glass particulate material on the lateral surface of a core which may be a porous glass body produced by the axial deposition of glass particulate material. The core rotates and moves longitudinally in one direction with respect to a flame hydrolysis burner. In addition, the burner reciprocatingly moves with respect to a portion of the length of the core. The reciprocating motion of the burner relative to the core material permits the soot preform to cool down between successive burner passes, thus increasing deposition rate due to enhanced thermophoresis. The continual longitudinal movement between the burner and the core material permits the formation of relatively long preforms or the continuous production of preforms from which fibers may be continuously drawn, if so desired. To form a radial gradient in the refractive index of the preform, the composition of the reactant vapor fed to the burner is varied in accordance with the position of the burner along its reciprocating path. During the reciprocating movement of the burner a conical section of preform is formed.

SUMMARY OF THE INVENTION

It is an object of the present invention to provide an efficient method and apparatus for forming graded index or other nonuniform refractive index optical fiber preforms.

Briefly, the method of the present invention is of the type wherein a cylindrical core member is rotated about its longitudinal axis, and a plurality of layers of glass particles are deposited thereon to build up a first coating of given thickness. In accordance with the improvement of the present invention, the layers are formed by directing toward a lateral surface of the core member first and second streams of glass particles, the composition of the first stream being different from that of the second stream. The first stream is reciprocatingly moved along a given length of the core member. The second stream is reciprocatingly moved along a length of the core member which includes the given length. The velocities of the first and second streams vary during the formation of the first coating, the function by which the first stream varies being different from the function by which the second stream varies. The velocity of each stream is a function of the radius of that part of the first coating that is being formed thereby.

In accordance with a first embodiment, the velocity of each stream is a function of the radius of the cylindrical layer being deposited. The first stream may deposit particles of glass having a refractive index lower than that of the particles of the second stream. The velocity of the first stream decreases, and the velocity of the second stream increases as the radius of the first coating increases. The instantaneous direction of movement of the first stream may be opposite that of the second stream.

In accordance with another embodiment the core member is longitudinally moved in one direction, and each of the first and second streams traverses the core member at a velocity that is a function of the position of the stream along its path of reciprocation, the velocity versus position function of the first stream being different from that of the second stream. The combined effects of the streams are such that continued performance of the method results in the deposition of a particulate material coating of given thickness on the core, the coating thickness tapering from the given thickness to zero thickness in the region of reciprocating movement of the streams. The refractive index of the particles of the second stream is greater than that of the particles of the first stream. The velocity of the first stream is less than that of the second stream when they are depositing on the relatively thick portion of the coating. The velocities of both streams change as they longitudinally traverse toward the thinner region of the deposit. The combined action of both streams results in the formation of a porous preform having a tubular section having a gradient refractive index.

The core member may comprise a temporary mandrel or an optical quality glass rod that will eventually form the central region of the resultant optical fiber. In one embodiment the core member is a continuously formed porous glass member. One or more streams of glass particles may be directed toward the end portion of the core member to continuously build up the length thereof as the core member is longitudinally moved so that the end surface remains at a substantially fixed position. In order to lessen the severity of discontinuities which may exist at the outer region of such a continuously formed core member, the streams of glass particles that are axially directed toward the core member end surface can be moved in an oscillatory fashion along an arcuate path while the streams are continuously directed toward the end surface.

The present invention also includes apparatus for performing the aforementioned functions.

Practicing the above-described methods results in the formation of a porous preform comprising a cylindrically-shaped region formed by a plurality of adjacent layers. Each layer is formed of two sublayers of glass particles, the first sublayer having a refractive index greater than that of the second sublayer. Each sublayer comprises two sections, a first section of the first sublayer being adjacent to one of the immediately adjacent layers and the second section of the first sublayer being adjacent to the opposite immediately adjacent layer.

In one embodiment wherein the layers are cylindrically shaped, the thickness of the first sublayer decreases with each successive layer of larger radius.

In an embodiment wherein the layers are conically-shaped, the thickness of the first sublayer decreases toward the base of each conically-shaped layer.

BRIEF DESCRIPTION OF THE DRAWINGS

FIG. 5 is a front elevational view of a variable speed burner traversing mechanism.

FIG. 6 shows the face of a burner which may be employed with the apparatus of the invention.

FIG. 7 schematically illustrates in block diagram form a system for controlling the speed of burners 40 and 41 of FIG. 3.

DETAILED DESCRIPTION OF THE INVENTION

Figures 1, 2:
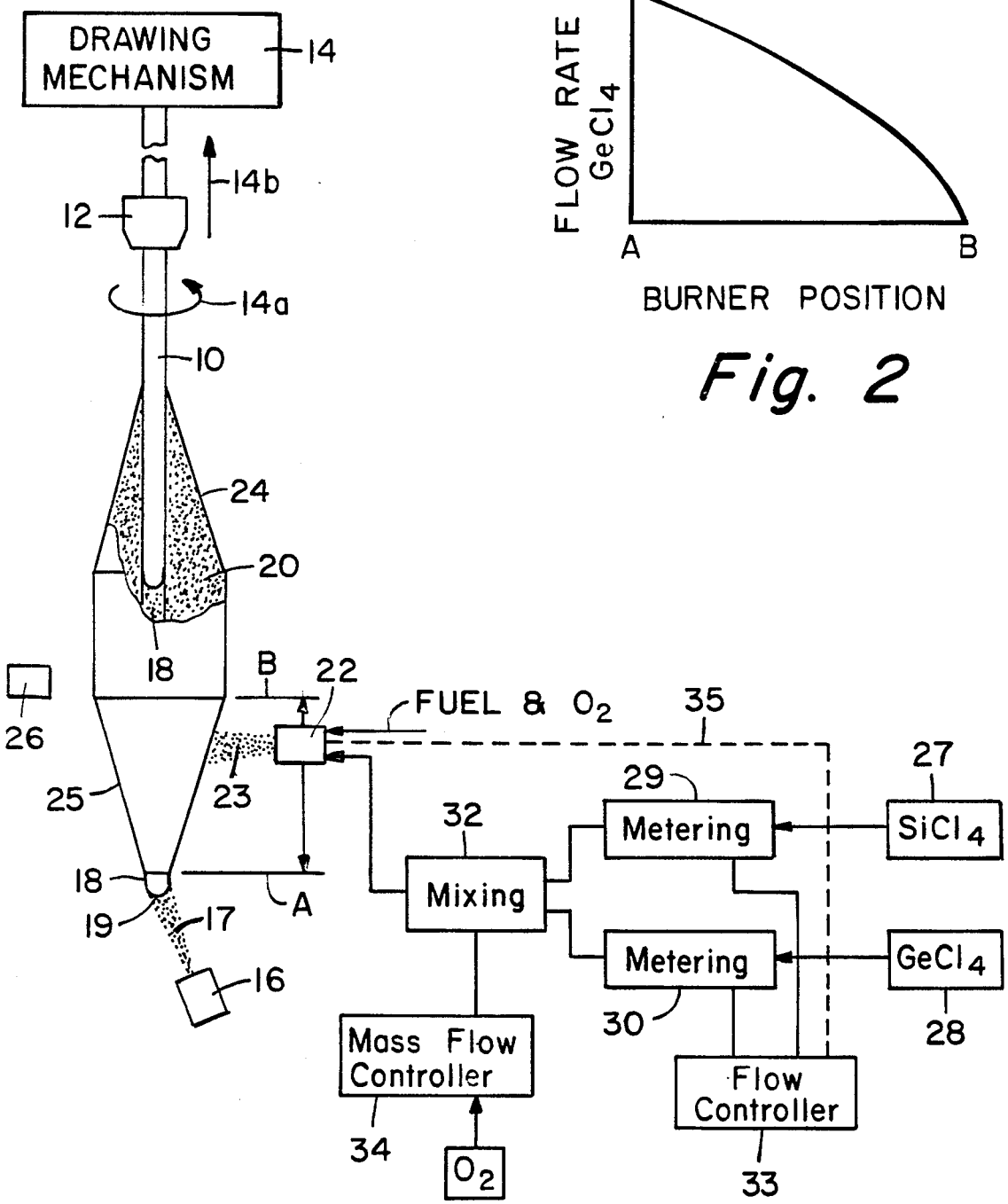
FIG. 1 is a schematic illustration of an apparatus for forming an optical waveguide preform.
FIG. 2 is a graph of dopant reactant flow rate v. burner position for the apparatus of FIG. 1.

FIG. 1 is a schematic illustration of the apparatus disclosed and claimed in my aforementioned U.S. Pat. No. 4,378,985. In this figure mandrel or starting member 10 of silica or other high temperature material is secured in chuck 12 which is rotated and translated along its longitudinal axis by mechanism 14 as illustrated by arrows 14a and 14b, respectively. Mandrel 10 is initially positioned near axial soot deposition means such as flame hydrolysis burner 16 so that the end surface thereof is in the path of the fine soot particles emitted therefrom. An adherent coating of glass soot, which will ultimately form the central core member 18 of the resultant preform, is initially deposited on the mandrel end surface. The glass soot 17 may be any material suitable for the core of an optical waveguide. Suitable means for delivering constituents to means 16 may be any means known in the art, for an illustration of which reference is made to U.S. Pat. Nos. 3,826,560; 4,148,621 and 4,173,305.

As the glass soot is deposited on the mandrel end surface, and the deposition is continued, porous preform core member 18 is built up. By a porous preform is meant a relatively porous body wherein small particles of glass become attached to one another with some voids therebetween. End surface 19 will be continually newly formed by the deposition of the glass soot. Since deposition means 16 would as a practical matter be stationary insofar as longitudinal translation is concerned, mandrel 10 is preferably translated along the longitudinal axis thereof in a direction illustrated by arrow 14b at a velocity corresponding to the rate build up of particulate material on end surface 19, so that end surface 19 is at a relatively fixed distance from means 16. Means such as the optical system disclosed in U.S. Pat. No. 4,062,665 may be employed to maintain said fixed distance.

Soot deposition means 16 can comprise any soot deposition burner or burners including flat faced burners, ribbon burners, ring burners, or the like, which provide a stream of glass particles that can be directed to the core member. For an illustration of suitable burners, reference is made to U.S. Pat. Nos. 3,565,345 and 4,165,223. Means 16 may also comprise nozzles such as those disclosed in U.S. Pat. No. 3,957,474 which emit reactant vapors which are heated by means such as a laser beam to form a soot stream. Since a soot deposition burner is preferred, reference will hereinafter be made to that particular type of soot deposition means.

The burners could also be rotated about end surface 19. This may be in addition to rotating mandrel 10, in place thereof, or any combination therewith. Other suitable means for forming a porous preform core member by axial vapor phase oxidation techniques are disclosed in the aforementioned U.S. Pat. Nos. 3,957,474; 3,966,446; 4,062,665; 4,017,288, and 4,224,046, for example.

Burner 22 produces a stream 23 of glass particles which deposits on core member 18 to form an adherent coating 20 thereon. Burner 22 may comprise a plurality of burners disposed around core portion 18, and those burners could rotate about the preform axis. In a preferred embodiment, burners 16 and 22 do not rotate around the preform axis; rather, the preform rotates in the direction of arrow 14a as it is being formed. The particulate material 23 may be any material suitable for forming an optical waveguide fiber, its salient feature being its optical purity.

The reactant delivery system illustrated in FIG. 1 is that which is disclosed and claimed in U.S. Pat. No. 4,173,305. A source 27 of SiCl$_4$ is connected by metering pump 29 to mixing means 32. A source 28 of GeCl$_4$ is connected by metering pump 30 to mixing means 32. For additional details of the mixing means, reference should be made to U.S. Pat. No. 4,173,305, which is incorporated herein by reference. The amount of reactants flowing through pumps 29 and 30 is controlled by flow controller 33. Oxygen is supplied to mixing means 32 by way of mass flow controller 34. A coating of cladding glass soot (not shown) may be applied by a fixed or a reciprocating burner located in the vicinity of burner 26.

To form a gradient index fiber preform, the composition of the reactant vapor fed to burner 22 is varied depending upon the position of that burner. Dashed line 35 connecting burner 22 to flow controller 33 is illustrative of the fact that controller 33 is provided with a signal indicative of the position of burner 22. Burner 16 produces soot 17 which forms the central portion of the preform core. Soot 17 could comprise, for example, SiO$_2$ doped with one or more dopant oxides such as GeO$_2$. Burner 22 forms the remaining portion of the preform core. It therefore produces a stream of soot containing a maximum amount of dopant oxide when it reaches position A of its reciprocating movement, soot stream 23 containing less dopant material when burner 22 reaches position B. This could be accomplished, for example, by maintaining a constant flow of SiCl$_4$ through metering pump 29 while varying the flow of GeCl$_4$ through metering pump 30 in accordance with the position of the burner in the manner illustrated by the graph in FIG. 2. The maximum dopant concentration of soot 23 should be slightly less than that of soot 17.

The reciprocating motion of burner 22 is superimposed upon the constant relative motion of that burner with respect to the preform that is caused by movement of mandrel 10 in the direction of arrow 14b by drawing mechanism 14. The result is the formation of a conical region 24 at the start of deposition of coating 20 and a conical region 25 at that portion of coating 20 where soot is being deposited. Absent the reciprocating motion of burner 22, the longitudinal lengths of the tapered regions are determined by the width of the soot stream produced by the burner.

The longitudinal reciprocation of burner 22 along core member 18 results in increased soot deposition rates. If burner 22 were to remain stationary, the soot stream would continuously be directed at a relatively hot region of the preform upon which soot had just been deposited. In that situation the burner-emitted soot would not be strongly attracted to the region of the preform to which it is directed. Thus, more of the emitted soot would depart from its intended path and would fail to deposit on the preform. However, since burner 22 reciprocates back and forth along the preform axis, the burner-emitted soot particles are directed toward a relatively cooler portion of the preform. Thus, the thermophoresis force acting upon the soot particles is greater, and deposition efficiency is increased.

Figure 3:
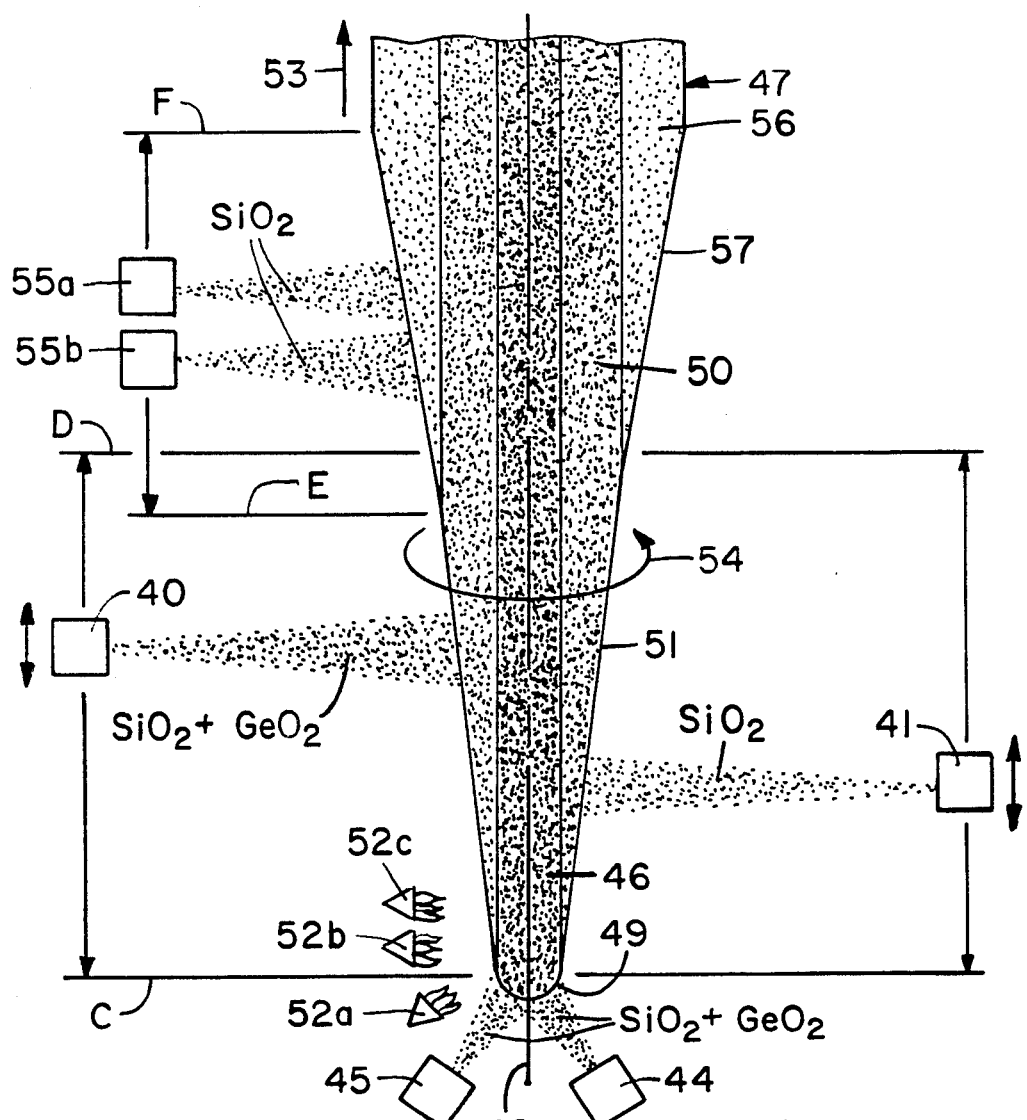
FIG. 3 is a schematic illustration of the apparatus of this invention.
Figure 4:
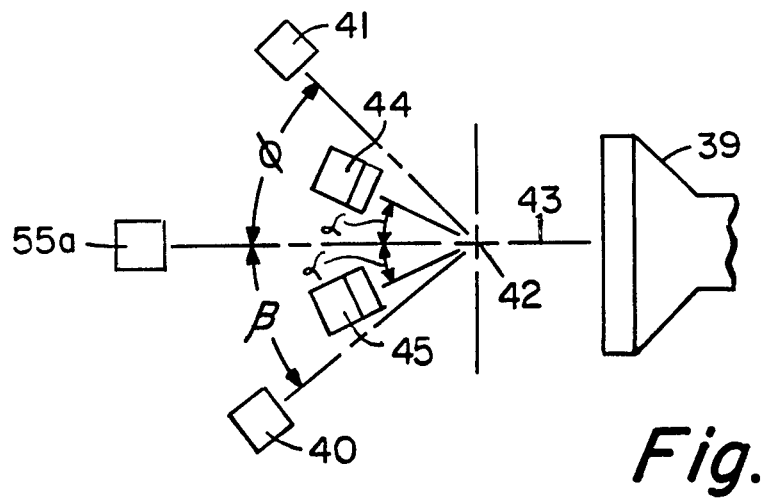
FIG. 4 illustrates the angular orientation of various components of FIG. 3 with respect to the preform axis.

One embodiment of the present invention is illustrated in FIGS. 3 thru 7. This apparatus differs from that of FIG. 1 in that two laterally disposed burners 40 and 41 are employed to deposit the outer region of the graded index core. For purposes of illustration burners 40 and 41 are shown in FIG. 3 as being situated on opposite sides of the preform. In an actual embodiment, the burners were situated around preform axis 42 in the manner illustrated in FIG. 4, wherein broken line 43 represents a reference plane in which the axis 42 lies. Such a burner orientation facilitates the collection of undeposited soot particles by exhaust hood 39.

This embodiment is similar to that of FIG. 1 in that it also employs a mandrel (not shown) upon which, inner core region 46 of preform 47 is formed by axial vapor deposition burners 44 and 45. As the mandrel is translated away from burners 44 and 45, end surface 49 is continually newly formed by the soot emanating from those burners.

Auxiliary burner 52a directs a flame toward the end of core portion 46, and auxiliary burners 52b and 52c direct flames toward the region where conical surface 51 meets core portion 46. Auxiliary heating burners 52a, 52b and 52c (not shown in FIG. 4) are employed for the purpose of hardening the soot and for controlling the temperature of that portion of the preform surface that is adjacent thereto. That portion of the soot from burners 44 and 45, which deposits on the region of conical surface 51 of smallest diameter, normally tends to be "soft" in that the particles are very loosely bound together. If allowed to remain in that state, the resultant preform would have an annular region of soft soot which would tend to crack during the consolidation process. Burners 52a, 52b and 52c are employed primarily for the purpose of heating the soft soot particles to cause them to strongly adhere to one another, thereby eliminating the aforementioned problem.

Lateral burners 40 and 41 traverse a length of core region 46 between points C and D to form thereon an outer core region 50. As indicated in FIG. 3, the composition of the soot stream emanating from burner 40 differs from that emanating from burner 41. The traverse rate of each of these burners varies as a function of burner position to vary the effective composition of the deposited soot as a function of core radius. This will be more fully described below. The reciprocating motion of burners 40 and 41 is superimposed upon the constant relative motion of those burners with respect to the preform that is caused by movement of the mandrel in the direction of arrow 53. The result is the formation of a conical region 51 in that portion of the outer core region 50 wherein soot is being deposited.

Burners 55a and 55b are disposed along that region of preform 47 which is longitudinally adjacent to conical region 51. One or more of the burners 55a and 55b deposit a coating 56 of cladding soot on the outer surface of soot coating 50. Burner 55a may be employed to merely provide heat. Burners 55a and 55b preferably reciprocate longitudinally along preform 47 between points E and F while coating 56 of cladding soot is being deposited. Burner traverse path E-F may overlap, abut or be spaced from burner traverse path C-D. Conical region 57 is formed in the region of the preform where coating 56 is being deposited because of the superimposition of the reciprocating burner motion onto the constant relative motion of burners 55a and 55b with respect to preform 47 represented by arrow 53. The movement cycle of burners 55a and 55b is preferably about 90° out of phase with respect to that of burners 40 and 41. That is, burners 55a and 55b reach endpoint E about when burners 40 and 41 are at the midpoint of their path of traverse.

Figure 8:
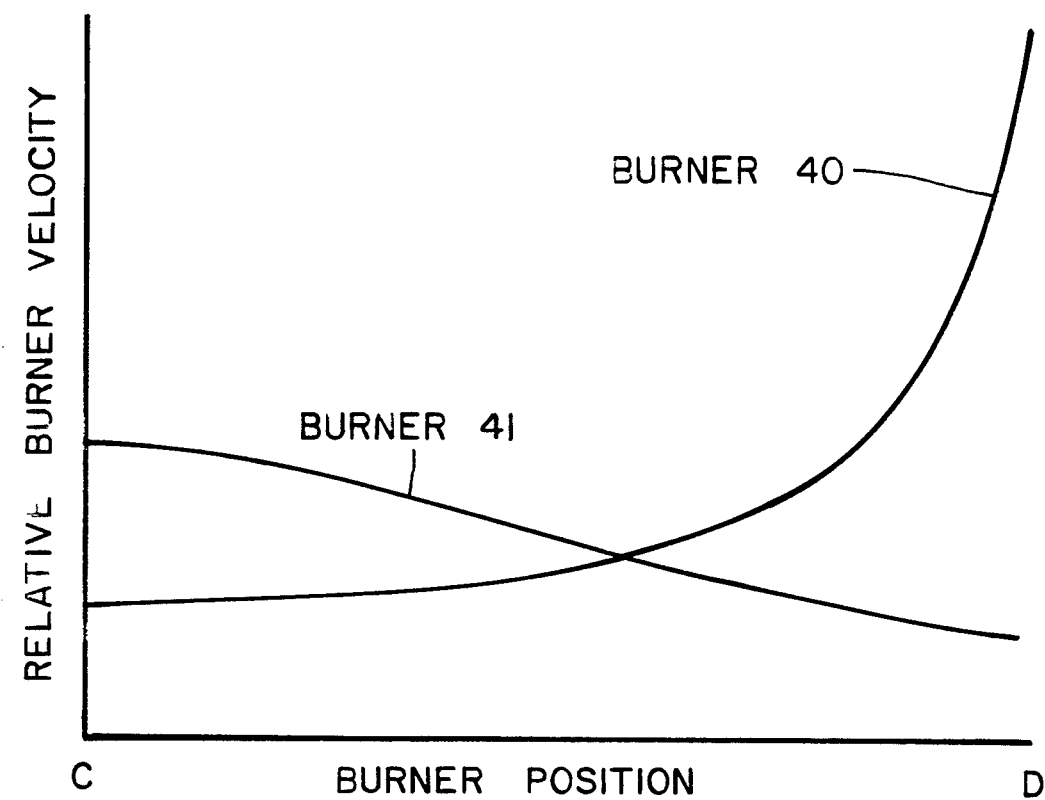
FIG. 8 is a graph of burner velocity v. burner position.

Outer core region 50 can be formed with a radial refractive index gradient by appropriately controlling the ratio of the speeds of burners 40 and 41 as they traverse each point along axis 42 between extremes C and D of their path. For example, if burner 40 deposits $SiO_2$ doped with 30 weight percent $GeO_2$ and the prescribed profile requires 25 weight percent $GeO_2$ at a particular point, then burner 41 would move about five times faster than burner 40 past that particular point. Likewise, if the composition required at another radius within outer core region 50 is 5 weight percent $GeO_2$ then burner 41 would move about 1/5 as fast as burner 40 at that point. The mechanical implementation of the invention is simplified if the following conditions exist: (1) that burner 40 deposits a composition containing a somewhat higher dopant concentration than that required at any part of the profile and (2) that the outermost region of the core contains a small amount of the core dopant. One further condition which makes the mathematics simpler is that equal times be set for burners 40 and 41 to make the round trip between points C and D. The graph of FIG. 8 shows the calculated speeds of burners 40 and 41 at each burner position between points C and D in order to form a graded index profile having an alpha value of 2.

An apparatus suitable for traversing a burner at a variable speed between two points is shown in FIG. 5. A vertical table 65 is situated on that side of preform axis 42 opposite exhaust hood 39 (see FIG. 4). Only the apparatus employed in the vertical movement of burner 41 is shown in this figure, similar apparatus being employed in the movement of burners 40 and 55. Vertical shaft 66 is supported in spaced relationship with respect to table 65 by supports 67 and 68. Two support ribs 69 are connected to plate 71. Burner 41 is mounted on an x-y positioner 70 which is affixed to plate 71. The ends of ribs 69 are provided with bushings 72 through which shaft 66 passes. Also mounted on plate 71 is a reversing mechanism 73. A variable speed drive motor 74 is coupled to shaft 75 which is vertically supported by bearings 76. Shaft 75, which rotates in only one direction, operatively engages reversing mechanism 73. To provide greater stability, plate 71 can be provided with one or more additional sets of ribs having bushings which are slidably mounted on additional vertical shafts.

Motor 74 is a stepping motor, the rotational speed of which depends upon the frequency of an input signal applied thereto. Shaft 75 has a smooth surface which contacts an angularly oriented member (not shown) which forms a part of reversing mechanism 73. The vertical speed of plate 71 is determined by both the rotational speed of shaft 75 and the specific orientation or switched state of the angularly oriented member with respect to the shaft. When reversing mechanism 73 contacts one of the stops 77, which are affixed to table 65, the angularly oriented member of mechanism 73 is mechanically switched to an opposite state whereby the direction of movement of plate 71 reverses. Obviously, other comparable reversible drive mechanisms could be employed. For example, a rack and pinion gear arrangement could be used in conjunction with a reversible motor.

Because of the number of components which had to be used within a confined space, a relatively small burner was employed. The front face 79 of the burner illustrated in FIG. 6 is about 20 mm by 32 mm. Centrally disposed on face 79 is an orifice 80 for delivering a stream of reactant vapors. Orifice 80 is surrounded by a circular array of orifices 81 located on a radius of 2.6 mm. Oxygen issues from orifices 81 to form a so-called "inner shield" of oxygen around the reactant vapor stream. Premixed oxygen and fuel gas issue from orifices 82 which are disposed on face 79 in a square array which is about 9 mm between opposed linear arrays.

FIG. 7 shows in block diagram form a circuit which may be employed to control the speed of the drive motor. The computer system 84 may consist of a PDP 11/34 mini computer having a CAMAC interface. Computer 84 stores a series of digital numbers, each one corresponding to the velocity of the burner at each point along its traverse. The computer determines burner velocity and sends a digital number to digital-to-analog converter 85. The output of converter 85 is coupled to voltage-to-frequency converter 86 which transmits a series of square wave pulses to both amplifier 87 and presettable up-down counter 88. Counter 88 keeps track of the position to which the burner has been driven by counting the pulses transmitted thereto from converter 86. In the specific example described hereinbelow computer 84 provided converter 85 with a digital number one hundred and one times during the traverse of a burner between limit switches 89.

Counter 88 is preset by computer 84 to a number corresponding to the number of steps that the motor is to be driven before a speed change is to be made. As each step is made, the counter is decremented by one. When the counter underflows (counts down to −1) it generates an interrupt signal which is transmitted to computer 84. The computer acknowledges the interrupt signal by running the subroutine which changes the motor speed, when necessary, by transmitting a new digital signal to converter 85, and it also resets counter 88. When a limit switch 89 is contacted by plate 71, the closing of that switch causes interrupt module 90 to generate an interrupt signal which is transmitted to computer 84 to inform the computer that reversing mechanism 73 has been mechanically switched. The interrupt signals generated by module 90 are used by the computer to keep the burner in proper sequence, not only the corrected velocity with respect to position along the preform, but also with respect to the other burners.

The apparatus of FIGS. 3 through 7 was employed in the following manner to form an optical waveguide fiber. In this specific example, the system of FIG. 7 consisted of the following components. Reversing mechanism 73 was a Uhing Model 3 RG 30/35. Motor 74 was a Slo-Syn stepping motor, the shaft of which rotated 1/200 revolution for each input pulse. Amplifier 87 was a Model ST105 packaged translator. Both motor 74 and amplifier 87 were manufactured by the Superior Electric Co. The translator was a high speed motor control device which receives pulses from converter 86 and converts those pulses into the switching sequence needed to drive the motor in steps. Converter 85 was a Model 3112 8-Channel, 12-bit D/A converter. Converter 86 was a Model 3560 Quad V-F converter. Counter 88 was a Model 3640 4-Channel, Up-Down presettable counter. Converters 85 and 86, counter 88 and the CAMAC interface for computer 84 were manufactured by Kinetic Systems Corp.

Burner position and orientation will be defined by the distance between the burner face and preform axis 42 and the angles between the burner axis and both preform axis 42 and plane 43. The burner axis is herein defined as that line perpendicular to the burner face about which the initially-formed portion of the soot stream is symmetrical. End surface 49 of preform 47 was continuously formed by axial burners 44 and 45 which were located about 10 cm from surface 49. the axes of burners 44 and 45 formed angles of 50° and 70°, respectively, with preform axis 42, and the angle $\alpha$ between the axis of each of these burners and plane 43 was 30°. Lateral burners 40 and 41 were located 14 cm from axis 42, and both traversed a distance of 18.4 cm along preform 47 between points C and D, thereby generating conically-shaped region 51. The angles $\beta$ and $\phi$ between burners 40 and 41 and plane 43 were 37° and 45°, respectively. End point C of the traverse of burners 40 and 41 was such that the soot deposited by those burners at end point C slightly overlapped the deposit being formed by burners 44 and 45, point C being about 1.5 cm above the tip of end surface 49. The velocities of burners 40 and 41 varied with respect to burner position in accordance with the curves of FIG. 8. The velocities of burners 40 and 41 at point C were 4 cm/sec and 8 cm/sec., respectively and at point D were 16 cm/sec and 3.2 cm/sec., respectively. Burners 55a and 55b, which consisted of two tademly mounted burners located 15.2 cm from axis 42, traversed along axis 42 between points E and F at a constant velocity. In this embodiment, burner 55b deposited pure silica whereas burner 55a functioned as an auxiliary burner and merely supplied heat. Burner 55b traversed about 25 mm past the end point D of traverse of burners 40 and 41. Point F was located 17.8 cm above point E.

A drawing mechanism and chuck similar to those illustrated in FIG. 1 were employed. Preform 47 was traversed upwardly as illustrated by arrow 53 and rotated as illustrated by arrows 54. To reduce mechanical vibration, three small shock absorbers were employed. Each of these shock absorbers comprised an air dashpot, one end of which was fixedly mounted, the other end having a wheel which rode on the rotating mandrel.

The flow rates in liters/min of gases and reactant vapors to the various burners were as tabulated in Table 1, and the fuel gas and oxygen flow rates for the auxiliary burners were as set forth in Table 2. Each of the soot-producing burners was provided with a 7 cm long cylindrical shield of the type to be described in conjunction with FIG. 16.

TABLE 1

| | Burner No. | | | | | |
|---|---|---|---|---|---|---|
| | 40 | 41 | 44 | 45 | 55a | 55b |
| Flame | | | | | | |
| Fuel Gas | 2.20 | 2.77 | 0.97 | 0.85 | 2.42 | 4.26 |
| Oxygen | 1.15 | 2.00 | 0.33 | 0.29 | 2.27 | 3.02 |
| Inner Shield Oxygen | 4.73 | 4.73 | 0.73 | 0.89 | 4.73 | 4.73 |
| Reactants | | | | | | |
| SiCl$_4$ | 0.47 | 0.49 | 0.47 | 0.29 | — | 0.48 |
| Oxygen | 0.62 | 0.64 | 0.62 | 0.38 | — | 0.63 |
| GeCl$_4$ | 0.073 | — | 0.032 | 0.42 | — | — |
| Oxygen | 0.29 | — | 0.129 | 0.169 | — | — |

TABLE 2

| | Auxiliary Burner No. | | |
|---|---|---|---|
| | 52a | 52b | 52c |
| Fuel Gas | 1.39 | 1.28 | 0.37 |
| Oxygen | 1.15 | 1.06 | 0.49 |

Figure 9:
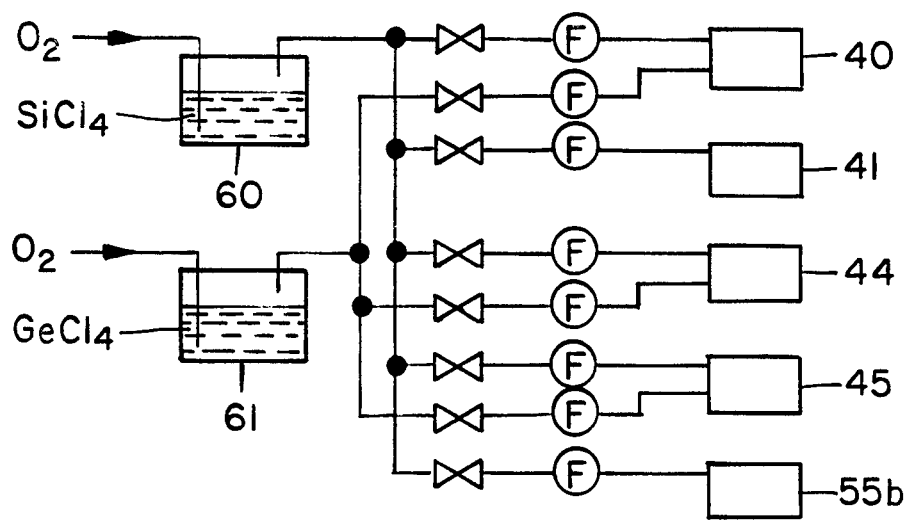
FIG. 9 is a schematic illustration of a reactant delivery system which may be employed with the apparatus of FIG. 3.

The reactant delivery system employed in this example is schematically illustrated in FIG. 9. The liquid reactants SiCl$_4$ and GeCl$_4$ were maintained at 40° C. and 35° C. in reservoirs 60 and 61, respectively. Oxygen was bubbled through the liquid SiCl$_4$, and the resultant mixture of oxygen and SiCl$_4$ vapors was fed to burners 40, 41, 44, 45 and 55b via a plurality of valves and flowmeters. Oxygen was also bubbled through the liquid GeCl$_4$, and the resultant mixture of oxygen and GeCl$_4$ vapors was fed to burners 40, 44 and 45 via a second plurality of valves and flowmeters. The temperature of the liquid reactant and the flowmeter reading for both oxygen and reactant being known, the flow rates of the oxygen and the reactant vapor were calculated. The calculated values are set forth in Table 1. For this reason, the flow rate of oxygen is listed twice under "reactants", each listing being for oxygen flow rate from a respective bubbler. A preform was made and consolidated, no attempt being made to dry the preform. The consolidated preform was drawn into a fiber having an attenuation of 2.9 dB/km at 850 nm and 1.54 dB/km at 1060 nm.

Figure 10:
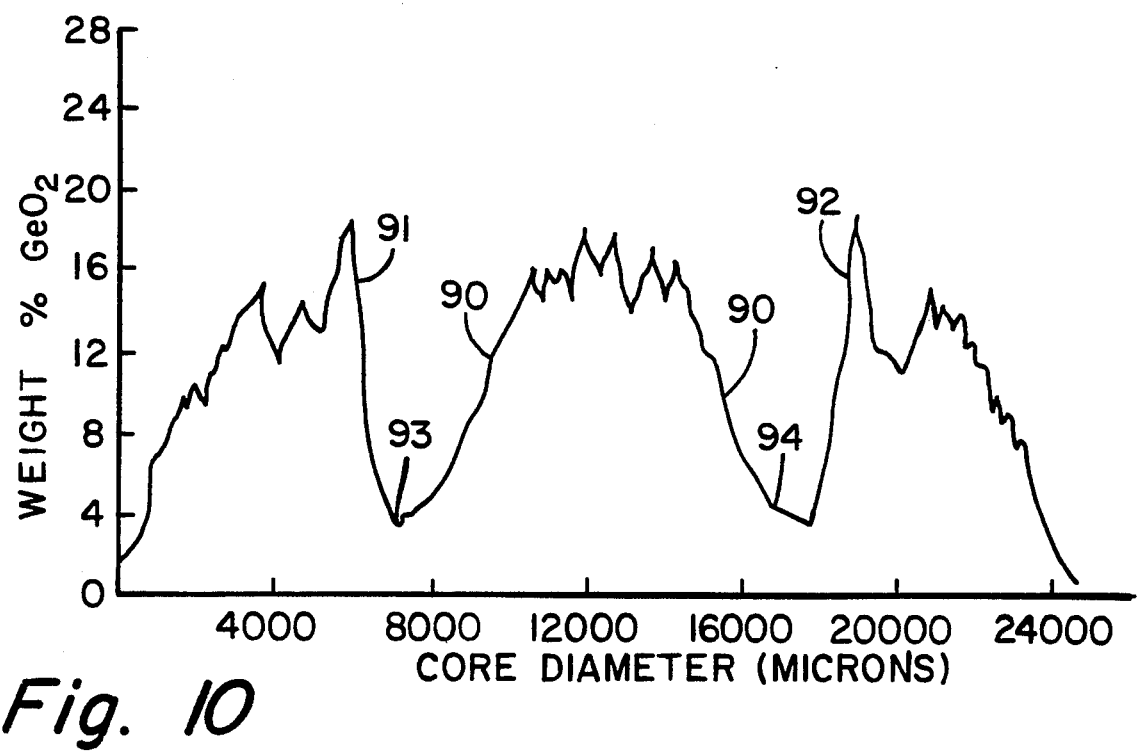
FIGS. 10 and 11 are graphs of weight percent $GeO_2$ v. core diameter for two optical waveguide preforms formed by employing two different embodiments of the method and apparatus of the present invention.

The maximum deposition rate for steady state deposition on the apparatus of FIGS. 3 through 7 was 4.7 g/min. Preforms fabricated under these conditions approached 13 cm. in diameter. A typical microprobe analysis of the GeO$_2$ concentration across the diameter of the core region of a preform is shown in FIG. 10. The axial core region, which is located between about 8,000 and 18,000 microns, has a $GeO_2$ concentration gradient represented by curve 90, and the lateral core regions have $GeO_2$ concentration gradients represented by curves 91 and 92. Large depressions 93 and 94 occur in the concentration gradient between the axial core region 90 and the lateral core regions 91 and 92, respectively. The loss of germania evidenced by depressions 93 and 94 is probably caused by a low temperature zone in that region of preform 47 between the axially-produced core 46 and laterally-produced core 50.

Optical fibers of the type formed in accordance with the above example are useful for propagating optical signals over relatively long distances because of the low loss thereof. However, because of the presence of depressions 93 and 94 in the core dopant concentration, the refractive index gradient of such a fiber would have similar depressions. A multimode fiber having such index depressions would have a band width not much higher than that of a step index fiber. However, a single mode fiber having refractive index depressions within the core can provide high bandwidth. Such a single mode fiber is disclosed in U.S. patent application Ser. No. 328,369 filed Dec. 7, 1981 entitled "Low Dispersion, Low-Loss Single-Mode Optical Waveguide".

Figure 11:
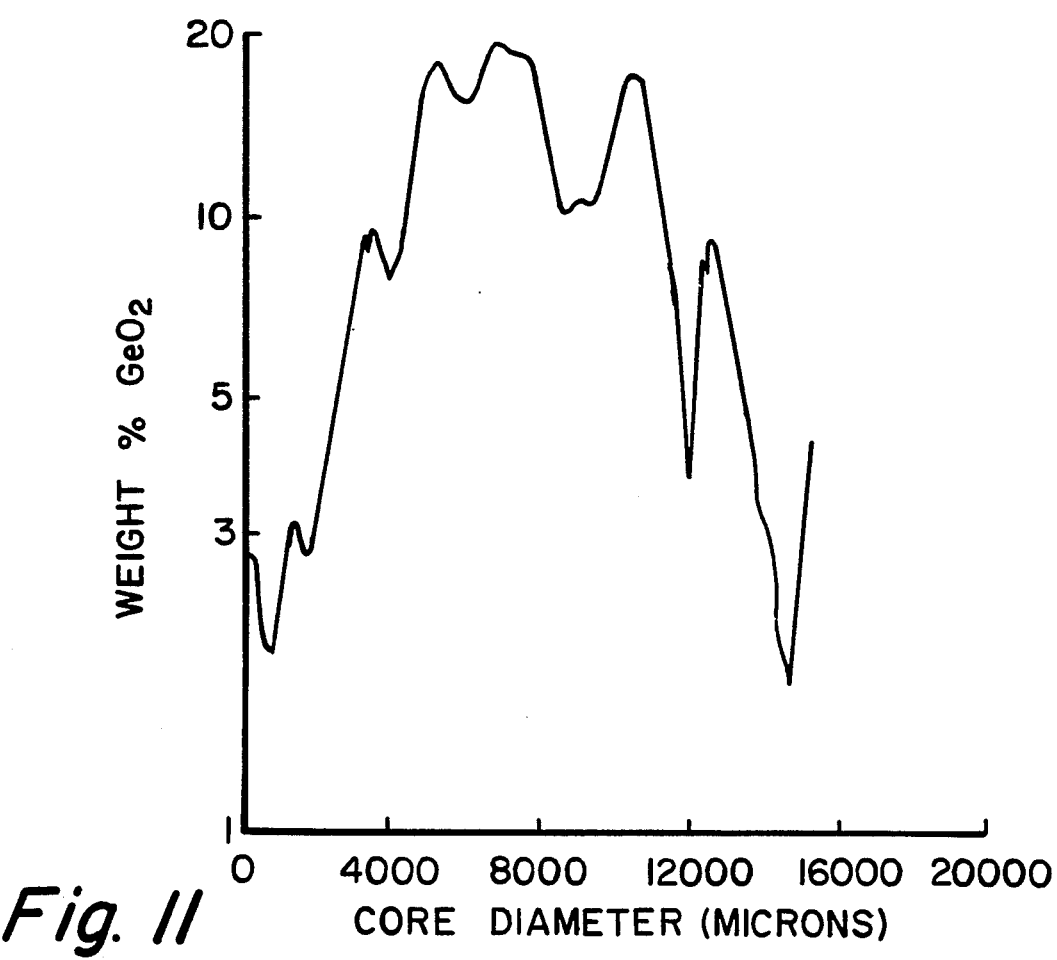

As mentioned above, it is desirable to minimize the refractive index depressions 93 and 94 of FIG. 10 in order to obtain high bandwidth multimode optical fibers. An optical waveguide preform having the improved germania concentration gradient illustrated in FIG. 11 was obtained by modifying the procedure specified in the above-described example. In this embodiment point C was located about 1 to 2 cm below end surface 49 of the preform (see FIG. 3). Indeed, burners 40 and 41 were traversed beyond end surface 49 a distance sufficient that the soot streams therefrom no longer deposited on the preform. Also, burners 44 and 45 were oscillated about end surface 49 in the manner described hereinbelow. Aside from the changes described immediately above, the method which resulted in a preform represented by the microprobe profile of FIG. 11, including flow rates to the burners, is similar to that described in the first example.

Figure 12:
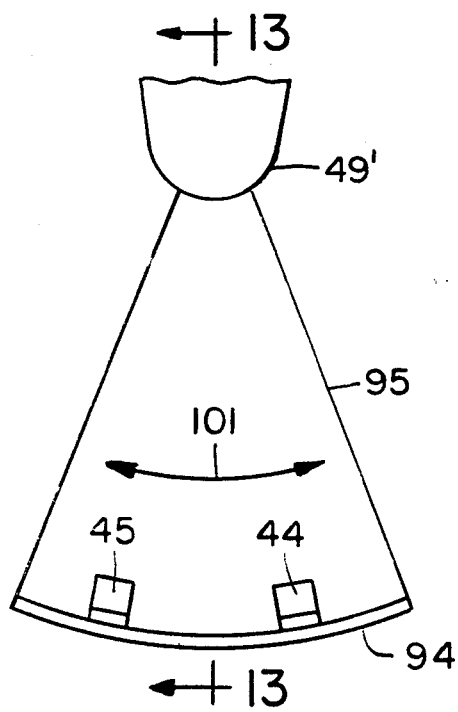
FIG. 12 shows an apparatus for rocking axial burners about the tip of a preform.
Figure 13:
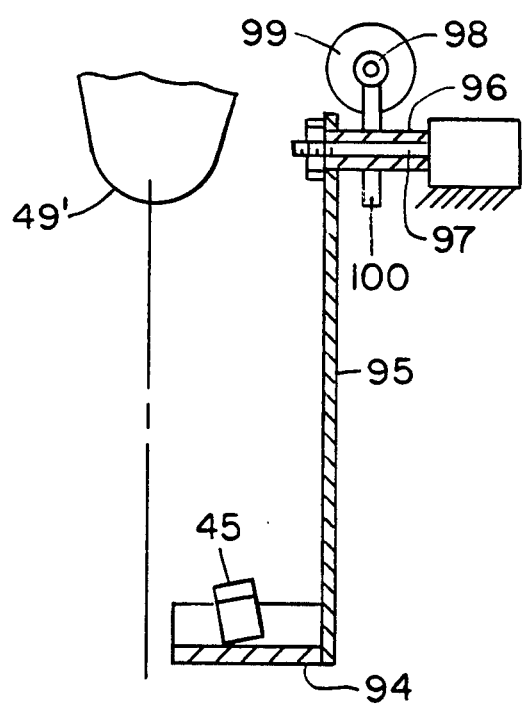
FIG. 13 is a cross-sectional view taken along line 13—13 of FIG. 12.

The apparatus for oscillating burners 44 and 45 about end surface 49 is illustrated in FIGS. 12 and 13. Burners 44 and 45 are mounted on platform 94 that is connected by arm 95 to sleeve 96 which is rotatably mounted on shaft 97. Work gear 98, which is rotated by motor 99, engages circular gear 100 that is affixed to sleeve 96. This mechanism can be employed to oscillate burners 44 and 45 along an arcuate path below preform end surface 49 as indicated by arrow 101 by continuously changing the direction of rotation of motor 99.

Figure 14:
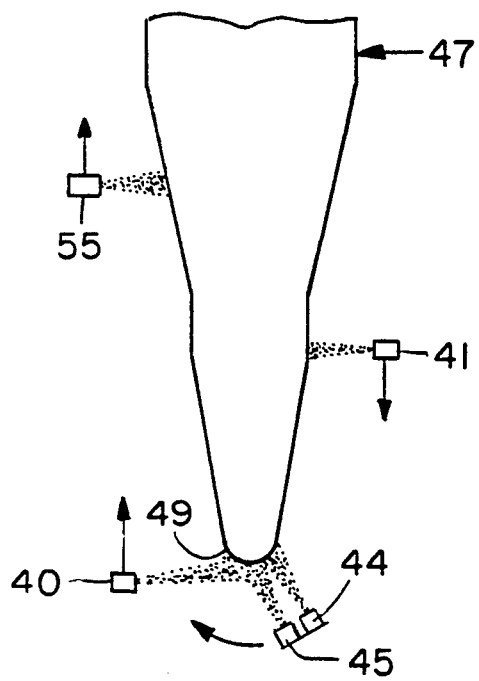
FIGS. 14 and 15 are schematic representations of the burners at different times during their movement cycle.
Figure 15:
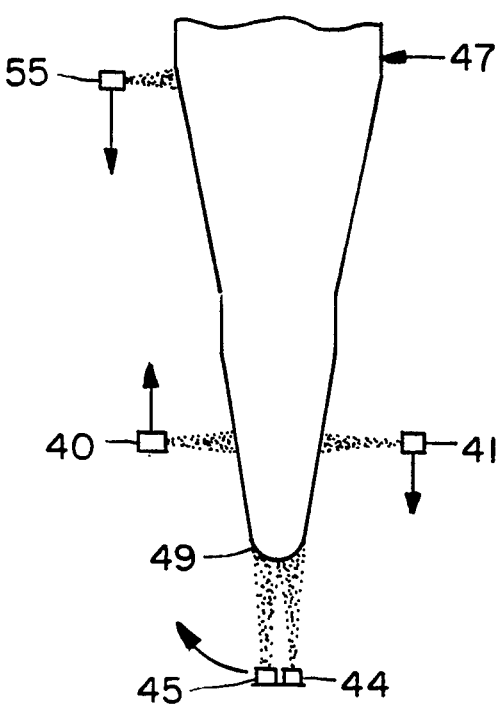

The movement of burners 40, 41, 44, 45 and 55 may be synchronized in the manner illustrated in FIGS. 14 and 15. As shown in FIG. 14, burners 44 and 45 have oscillated to one extreme position when burner 40 has reached its lowest position. Burner 41 is at the top of its path, and burner 55 in the center of its path and is moving upwardly. The arrow connected to each burner indicates the direction in which it is moving or in which it is about to move.

As shown in FIG. 15, burners 44 and 45 are in the middle of their oscillatory path when burners 40 and 41 are in the middle of their paths of movement. At this time burner 55 has just reached the top of its path.

When burners 44 and 45 reach the opposite position of their swing, burner 41 will have reached its lowest point. At this time burner 40 will be in its topmost position, and burner 55 will be moving downwardly through the middle of its path.

In the final phase of burner movement, burner 55 reaches the bottom of its path as burners 40 and 41 are in the middle of their paths, burner 40 moving downwardly and burner 41 moving upwardly. At this time, burners 44 and 45 are in the middle of their oscillatory path.

Figure 16:
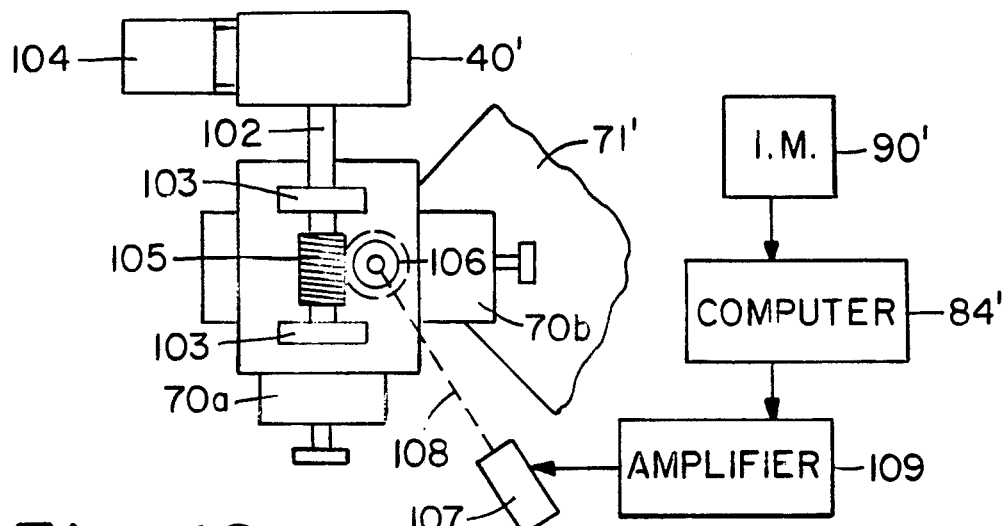
FIG. 16 is a plan view of an apparatus for changing the direction of a soot stream.

A further apparatus for smoothing the germania concentration profile is illustrated in FIG. 16, wherein elements similar to those illustrated in previously discussed figures are represented by primed reference numerals. An x-y positioner comprising separately movable sections 70a and 70b is mounted on plate 71'. Burner 40' is affixed to axle 102 which is rotatably mounted in bearings 103. A cylindrically-shaped shield 104 is affixed to burner 40' and spaced from the burner face by about 4 mm. A worm gear 105 affixed to axle 102 is operatively connected to gear 106 which is rotatable by a motor 107 as indicated by dashed line 108. Motor 107 is controlled by pulses generated by amplifier 109. Computer 84' operatively controls amplifier 109 in the manner described in conjunction with FIG. 7 by circuit components not illustrated in FIG. 16.

Figures 17, 18, 19:
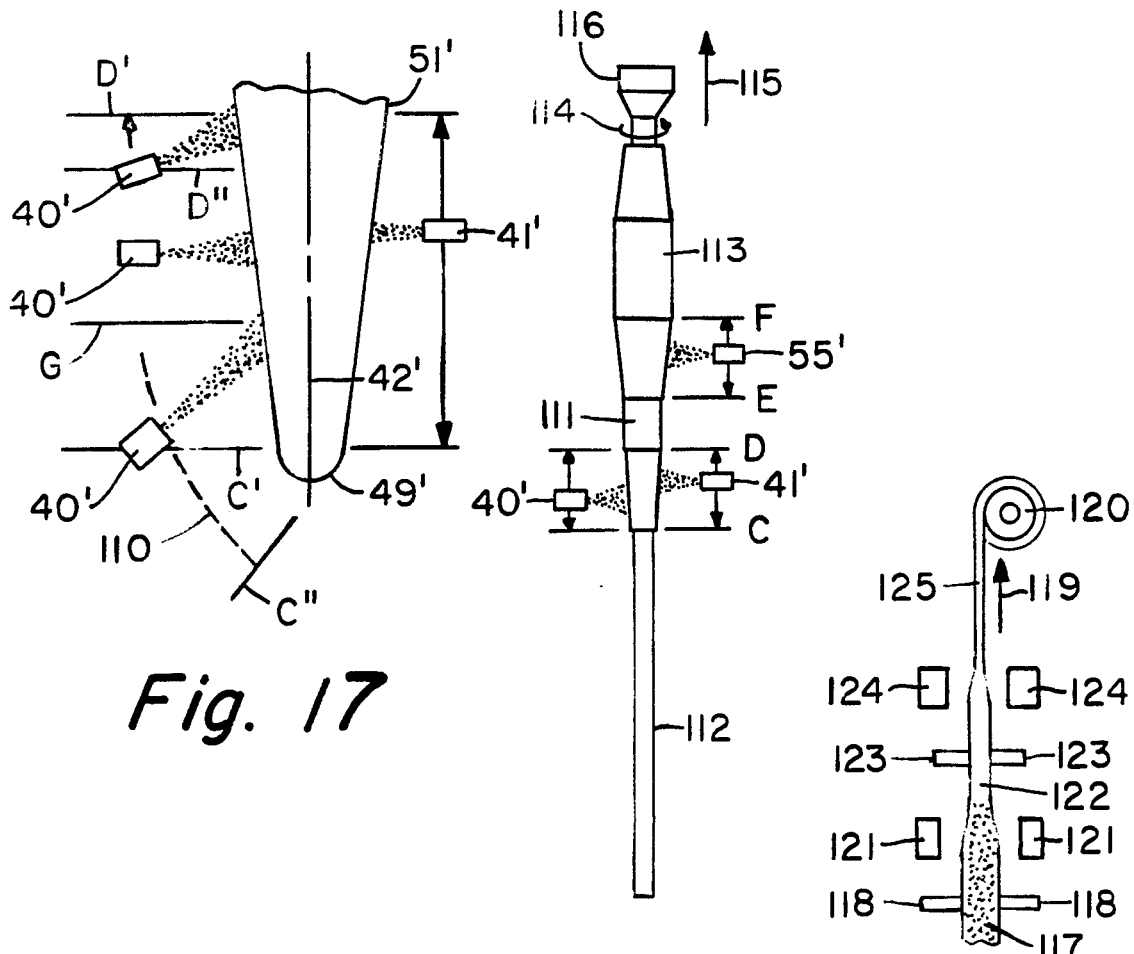
FIG. 17 is a schematic representation illustrating burner movement when the apparatus of FIG. 16 is employed; also illustrated is a burner traverse path having both linear and arcuate sections.
FIG. 18 illustrates a further embodiment of an apparatus in accordance with the present invention.
FIG. 19 illustrates a continuous fiber drawing process.

The apparatus illustrated in FIG. 16 can cause burner 40' to traverse between points C' and D' in the manner illustrated in FIG. 17. As burner 40' progresses from point D' toward C' its axis is initially perpendicular to preform axis 42'. When burner 40' reaches point G, motor 107 is energized and begins to rotate burner 40' so that the axis thereof intersects axis 42' but is no longer perpendicular thereto For example, the axis of burner 40' could be tilted upwardly along the preform as illustrated in FIG. 17; alternatively, the axis of burner 40' could be tilted downwardly when it reaches the upper extreme position along its path. Also, the soot stream from burner 40 can be directed downwardly beyond end surface 49', or upwardly along the preform when the burner reaches point C'.

Another modification illustrated in FIG. 17 eliminates the need to employ separate axial burners to form the inner core region of the preform. As burner 40' travels from point D' and arrives at some point such as point G, it begins to travel along an arcuate path represented by dashed line 110. It continues along path 110 until it reaches point C'', which may coincide with the previously described position of an axial burner. During its movement along path 110, the burner may tilt upwardly or downwardly as described above. Upon reaching point C'', the burner may be directed at surface 49' and reside for a time sufficient to extend the length of surface 49' by the required amount. Burner 41' could follow a similar arcuate path near the end of the preform.

The apparatus illustrated in FIG. 5 could be modified to cause a burner to traverse a path having linear and arcuate sections. The lower section of vertical shaft 68 would be curved toward preform axis 42. Bushings 72 would have to be sufficiently short that they would not bind on the curved section of shaft. Reversing mechanism 73 would continue to move in a linear, vertical path. However, mechanism 73 would be connected to plate 71 in such a manner that vertical movement of mechanism 73 could cause vertical movement of plate 71, but mechanism 73 could slide horizontally with respect to plate 71. Such a modification to the apparatus of FIG. 5, coupled with the burner rotating mechanism of FIG. 16 would enable a burner to reciprocatingly move along a linear path between points D' and G, for example, and then move along an arcuate path 110 to point C" while directing a soot stream toward end portion 49' of the preform core member.

The two or more longitudinally traversing burners 40' and 41' need not traverse between the same two end points. For example, burner 41' could stop at point C' while burner 40' traverses longitudinally to point C". Also, burner 40' could traverse upwardly to point D" while burner 41' traverses beyond that point to point D'. Point D" could be selected such that the dopant concentration tapers to zero at the edge of the core.

The embodiments illustrated in FIGS. 12, 13, 16 and 17 should ensure better blending of soot during deposition to prevent or minimize undesirable soot density and composition changes.

Some other modifications to the first described embodiment are as follows. A burner could emit soot, the composition of which comprises a base glass and two or more dopants. For example, a burner depositing $SiO_2$ doped with $GeO_2$ and $P_2O_5$ would allow the fabrication of an optical fiber having lower dispersion. In addition to varying burner velocity, the amounts of one or more constituents could vary with burner position as disclosed in my aforementioned copending application and as described in conjunction with FIG. 1 hereof. Three or more lateral moving, variable speed burners could be employed, each depositing soot having a different composition.

In the embodiment of FIG. 18 a coating 111 of soot is deposited on mandrel 112 by burners 40' and 41'. A coating 113 is deposited on the surface of coating 111 by burner 55'. Mandrel 112 may be formed of a material such as glass, ceramic or the like having a coefficient of expansion compatible with that of the deposited material. Mandrel 112 is rotated and longitudinally translated as indicated by arrows 114 and 115 by chuck 116. Burners 40' and 41' reciprocate between positions C and D, and burner 55' reciprocates between positions E and F. This figure illustrates the embodiment wherein the extent of traverse of burner 55' does not overlap the extent of traverse of burners 40' and 41'. If mandrel 112 is to be removed from the porous preform prior to consolidation thereof, the mandrel surface may be coated with a layer of carbon soot prior to the deposition of glass soot thereon as taught in U.S. Pat. No. 4,233,052.

After the preforms produced in accordance with the aforementioned methods have reached a suitable length, they may be removed from the deposition apparatus and transported to a consolidation furnace where they are heated to a temperature sufficiently high to consolidate the glass soot particles and form a solid glass optical waveguide draw blank. If the mandrel is removed from the preform prior to drawing, the entire fiber core may be formed of glass deposited by the moving burners 40' and 41' (see FIG. 18). Alternatively, the initially provided mandrel 112 of FIG. 18 may form the central core region while the glass deposited by burners 40' and 41' forms the outer portion of the core.

To continuously produce an optical waveguide fiber, an apparatus such as that illustrated in FIG. 19 may be employed. This apparatus is similar to that taught in U.S. Pat. Nos. 4,230,472 and 4,310,339. Soot preform 117 is supported and rotated by means 118 while it is longitudinally translated thereby in the direction of arrow 119. Means 118 may comprise, for example, a plurality of rollers surrounding preform 117 and mounted so as to support, rotate and translate the structure. Such support roller means are well known in the art. Heaters 121 heat the porous preform to a temperature sufficient to consolidate it into a solid glass rod 122. The consolidated rod is supported and rotated by means 123 which is similar to the aforementioned means 118. The consolidated rod 122 passes between heaters 124 where the temperature thereof is raised to the drawing temperature of the materials thereof and is drawn into an optical waveguide fiber 125 which is wound on reel 120. Thus, a preform being formed in accordance with the present invention may be simultaneously drawn into a fiber.

Figure 20:
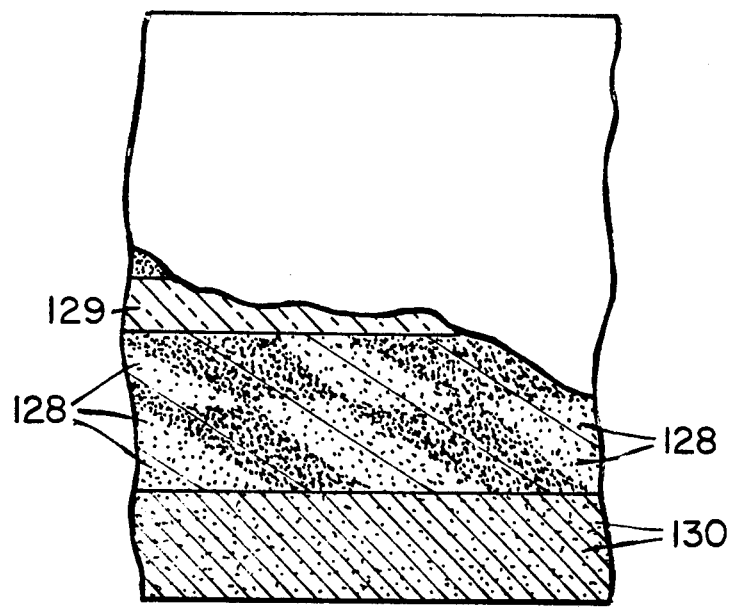
FIG. 20 is a partial cross-sectional view of a porous preform which may be produced by the method of the present invention.

FIG. 20 shows a fragmentary view, in partial cross-section, of a porous preform formed by the apparatus of any of the above-described embodiments. Conically shaped layers 128 are disposed on cylindrically shaped starting member 129. Each of the layers 128 is formed of two sublayers. Sublayers illustrated by a dense dot pattern have high dopant concentration. Sublayers illustrated by a sparce dot pattern represent a region containing little or no dopant. While starting member 129 is shown in a different type of cross-section, that member could be an axially formed porous structure of the type illustrated in FIG. 3 or a solid mandrel of the type illustrated in FIG. 18. The thicknesses of the sublayers vary with preform radius. Somewhere along the extent of each layer, the positions of the sublayers are reversed due to the crossing of the burners which form those sublayers.

For example, the layer represented by the dense dot pattern may consist of $SiO_2$ doped with $GeO_2$. The layer represented by a sparce dot pattern may consist of pure $SiO_2$. The refractive index at any radius within a particular layer depends upon the relative thicknesses of the two differently doped sublayers within that layer. In an optical waveguide preform, the $GeO_2$ containing sublayer within each layer has a greater thickness near the center of the preform. This is caused by the slower movement of the burner which deposits the $GeO_2$ containing soot as it forms that portion of the conically shaped layer which has a relatively small radius.

Conically shaped layers 130 of low refractive index material are formed on the outer surface of the preform section formed by layers 128. The sparce dot pattern of layers 130 indicates that they are formed of a material having little or no refractive index-increasing dopant. This outer or cladding region of the preform could also be formed of a base glass such as $SiO_2$ doped with a material such as $B_2O_3$ which decreases the refractive index of the base glass. The number of layers 130 can be equal to or different from the number of layers 128, and the pitch of these two layers can be the same or different, depending upon the speeds of the burners depositing the layers and the amount of soot deposited per pass.

Figure 21:
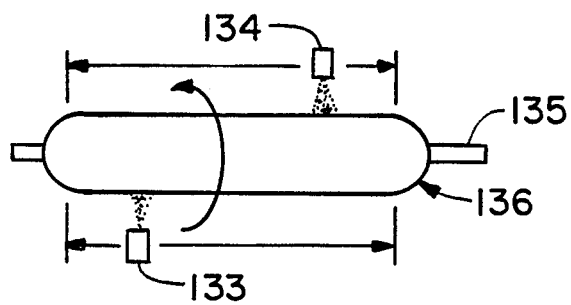
FIG. 21 illustrates a further embodiment of an apparatus in accordance with the present invention.
Figure 22:
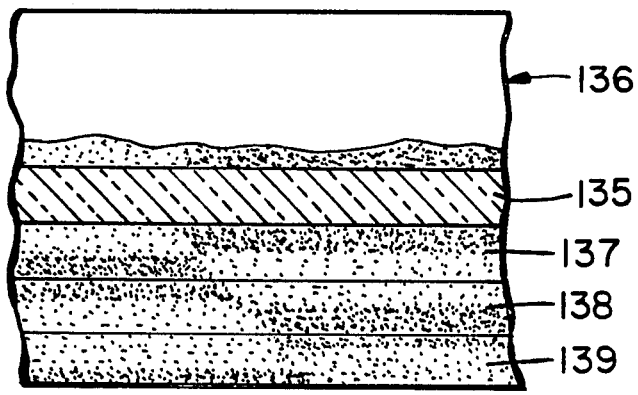
FIG. 22 is a partial cross-sectional view of a porous preform formed by the apparatus of FIG. 21.

The method of the present invention can also be employed to form cylindrically shaped layers. Referring to FIG. 21, burners 133 and 134 continuously traverse the same longitudinal portion of rotating mandrel 135. Burner 133 produces a stream or soot, the composition of which is such that it has a relatively high refractive index. Burner 134 produces a stream of soot, the composition of which is such that it has a relatively low refractive index. When layers of relatively small radii are being formed, the burner producing the high refractive index soot moves more slowly than that which produces the relatively low refractive index soot. This burner speed ratio is gradually changed as preform radius increases, the relative thickness of the high refractive index soot sublayer becoming smaller with increasing radius. Toward the outer portion of the core region of the preform, the thickness of the low refractive index soot sublayer is greater than that of the high refractive index soot sublayer. Referring to FIG. 22, first, second and third layers 137, 138 and 139 of soot are consecutively applied to starting member 135. As discussed in connection with FIG. 20, soot having a relatively high refractive index is represented by a dense dot pattern while that having a relatively low refractive index is represented by a sparce dot pattern. Since layers having relatively small radii must have a relatively high refractive index, the burner which produces the soot having relatively high refractive index moves more slowly than that which produces the relatively low refractive index soot. At the point of crossover of the two burners, the relative radial positions of the relatively high refractive index sublayer and the relatively low refractive index sublayer within a particular layer are reversed. The crossover point can occur at different longitudinal positions along mandrel 135 as illustrated in FIG. 22. If desired, burners 133 and 134 can simultaneously begin their scan at opposite ends of mandrel 135. Obviously, this necessitates the fast moving burner to wait at the end of its scan so that the slow burner can finish its traverse before the two burners again simultaneously begin their transverse.

I claim:

1. In a method of forming a porous glass preform comprising the steps of:
   providing a starting member having an axis of rotation on which is situated an end surface,
   rotating said starting member about said axis,
   directing at least one stream of glass particles onto said end surface to build up an adherent coating of particles thereon, and
   longitudinally moving said starting member to maintain the newly formed portion of said adherent coating a substantially fixed distance from the source of said at least one stream, continued dpeosition of said particles and longitudinal movement of the resultant build up forming a porous, cylindrical member having a continuously formed end portion
   the improvement comprising:
   oscillating the source of said at least one stream along an arcuate path about said end portion so that said stream is directed onto the end portion of said porous, cylindrical member, at different angles with respect to the longitudinal axis of said cylindrical member.

2. Method according to claim 1 further comprising the step of directing a lateral stream of glass particles toward said porous, cylindrical member, and reciprocatingly moving said lateral stream with respect to a portion of the length of said cylindrical member to deposit and build up in the region of reciprocating movement of said lateral stream, a coating of thickness which tapers from a maximum thickness to zero thickness, the oscillatory movement of said at least one stream being synchronized with the reciprocating movement of said lateral stream so that said at least one stream is directed toward the end portion of said porous, cylindrical member from a side thereof that is remote from the side thereof onto which said lateral stream is directed.

3. Method according to claim 1 wherein the step of directing at least one stream comprises providing a flame hydrolysis burner for generating a first stream of glass particles and wherein the step of oscillating the source of said at least one stream comprises the steps of disposing said burner upon a platform which pivots about an axis which passes through said end portion of said cylindrical member, and continuously reciprocating said platform back and forth about said axis.

4. In a method of forming a porous glass preform comprising the steps of
   providing an elongated cylindrical core member,
   rotating said core member,
   longitudinally moving said core member,
   directing a first stream of glass particles toward a lateral surface of said core member to build up a first coating of given thickness thereon,
   continuously reciprocating said stream of particulate material with respect to a portion of the length of said core member to deposit and build up in the region of reciprocation movement of said stream a coating of thickness which tapers from said given thickness to zero thickness,
   the improvement comprising the step of directing said stream perpendicular to the longitudinal axis of said core member during its reciprocating movement except during that time in which said stream is at or near the end of its path of reciprocation when the axis of said stream becomes oriented in a direction other than perpendicular to said longitudinal axis.

5. Method according to claim 4 wherein the step of providing a cylindrical core member comprises
   providing a starting member,
   rotating said starting member,
   moving said starting member along its axis of rotation,
   applying an adherent coating of glass particles to said starting member, the continued application of said adherent coating combined with the longitudinal movement of said starting member causing the formation of a porous, cylindrically-shaped core member, the continuously formed end portion of which is located on or near a plane that is perpendicular to said axis or rotation.

6. Apparatus for forming an elongated porous glass preform comprising
   means for supporting a mandrel,
   means for rotating said mandrel,
   means for longitudinally moving said mandrel in a first direction,
   means for initially directing a stream of glass particles onto said mandrel to form an initial portion of a porous preform and for thereafter directing said stream of glass particles onto the end portion of said porous preform to continuously form said end portion, and
   means for continously ocillating said means for directing in an arcuate path about said end portion so that said stream of glass particles is directed at the end portion of said preform at an angle with respect to the longitudinal axis of said preform, said angle continously varying with respect to time.

7. Apparatus according to claim 6 wherein said means for oscillating comprises a platform for supporting said means for directing, means for pivotally supporting said platform in such a manner that it pivots about an axis which passes through the end portion of said preform, and means for causing said platform to oscillate about said axis.

8. In an apparatus for forming a porous glass preform comprising
- means for supporting an elongated cylindrical core member,
- means for rotating said core member,
- means for longitudinally moving said core member in a first direction,
- source means for directing a first stream of glass particles toward a lateral surface of core member to build up a coating thereon, and
- means for reciprocatingly moving said source means with respect to a portion of the length of said core member, thereby forming on said core member a coating tapering from said given thickness of said coating tapering from said given thickness to zero thickness in the region in which said reciprocating motion of said source means takes place, the improvement comprising
- means for rotating said source means about an axis which is perpendicular to a plane which passes through said source means and which contains the axis of said cylindrical core member so that said source means can direct said stream toward said lateral surface at different angles with respect to the axis of said core member.

* * * * *

UNITED STATES PATENT AND TRADEMARK OFFICE
CERTIFICATE OF CORRECTION

PATENT NO. : 4,726,827
DATED : February 23, 1988
INVENTOR(S) : Dale R. Powers

It is certified that error appears in the above-identified patent and that said Letters Patent is hereby corrected as shown below:

Col. 10, line 7, change "arrows" to --arrow--

Col. 12, line 44, change "arcuatc" to --arcuate--

Col. 15, line 29, change "transverse" to --traverse--

Col. 16, line 19, change "reciprocation" to --reciprocating--

Col. 18, line 1, "tapering from said given" should be --of given thickness, the--

Signed and Sealed this

Fourteenth Day of November, 1989

*Attest:*

JEFFREY M. SAMUELS

*Attesting Officer*  *Acting Commissioner of Patents and Trademarks*